United States Patent [19]

Burnham et al.

[11] Patent Number: 4,732,712
[45] Date of Patent: Mar. 22, 1988

[54] STEAM INJECTION WATER HEATER

[75] Inventors: Gregory Burnham, Andover; Jack Kahrs, Denville, both of N.J.; Anthony T. Posluszny, Land O'Lakes, Fla.

[73] Assignee: Leslie Controls, Inc., Tampa, Fla.

[21] Appl. No.: 55,010

[22] Filed: May 28, 1987

[51] Int. Cl.$^4$ ............................................. G05D 11/00
[52] U.S. Cl. ............................. 261/64.3; 261/36.1; 261/DIG. 76; 137/98; 137/896
[58] Field of Search .................. 137/98, 896; 261/122, 261/DIG. 76, 64.3, 36.1

[56] References Cited

U.S. PATENT DOCUMENTS

| | | |
|---|---|---|
| 2,223,837 | 12/1940 | Spitzglass . |
| 2,244,910 | 6/1941 | Hartmann . |
| 2,335,250 | 11/1943 | Adlam . |
| 2,455,498 | 12/1948 | Kerh .................................. 261/36.1 |
| 2,483,426 | 10/1949 | Moore ................................ 261/64.3 |
| 2,572,253 | 10/1951 | Fellows et al. . |
| 2,879,943 | 3/1959 | Dubitzky et al. . |
| 3,068,387 | 12/1962 | Koppel . |
| 3,670,807 | 6/1972 | Muller . |
| 4,431,132 | 2/1984 | Edmundson et al. . |
| 4,675,165 | 6/1987 | Kuckens et al. ................... 261/64.3 |

Primary Examiner—Carroll B. Dority, Jr.
Attorney, Agent, or Firm—Lerner, David, Littenberg, Krumholz & Mentlik

[57] ABSTRACT

An apparatus for controlling the temperature of a supply of water by selective injection of steam is disclosed. The apparatus comprises a water supply conduit which includes a water inlet end and a water outlet end. Steam is supplied to the apparatus by a steam supply conduit which supplies steam to the water supply conduit at a predetermined location between the water inlet end and the water outlet end of the water supply conduit. The steam entering the water supply conduit is controlled by a steam supply control valve located on the steam supply conduit. A pressure differential sensing means senses the difference in pressure along the water supply conduit between a first point in said water supply conduit, upstream of said predetermined location and a second point in the water supply conduit downstream of the predetermined location. A means for controlling the control valve means in response to this sensed pressure differential is also required.

16 Claims, 3 Drawing Figures

STEAM INJECTION WATER HEATER

FIELD OF THE INVENTION

This invention relates to the field of heating water. More specifically, this invention relates to the field of heating water by steam injection. Even more specifically, this invention relates to heating water by steam injection using a feed forward type control.

BACKGROUND OF THE INVENTION

The rapid heating of water to high temperature is necessary in many industrial settings. Most commonly, such settings are found in food processing and manufacturing. The prime use in these industries for such apparatus is in the washing and cleansing of food processing equipment. For instance, breweries and dairies require apparatus capable of rapidly heating water to high temperatures. This need is not easily fulfilled because of the sudden shifts in water flow rate needed in such facilities.

Common and widespread problems are extant with the use of existing water heating. Among the more common problems are that extant water heating apparatus cannot heat water regardless of water flow fluctuations and cannot supply hot water upon demand without at least some time lag during which the apparatus heats water to a temperature other than the desired temperature. Approaches in the prior art neither successfully overcome these problems nor attempt to solve them in the manner of the instant invention. In U.S. Pat. No. 2,335,250, a steam supply valve 16 is controlled by thermostatic means, not by a feed forward pressure differential as in the instant invention. U.S. Pat. No. 4,431,132 heats water by gas firing using a gas supply valve, not steam, to heat water. U.S. Pat. No. 3,670,807 holds water in a hot water storage means which inevitably provides a slower heating than the feed forward steam injection system of the instant apparatus. In U.S. Pat. No. 2,879,943, a non-steam heat source is used to heat water in a heat exchanger. Further, this latter apparatus involves combustion not present in the instant invention.

The instant invention overcomes these problems without use of a hot water storage tank or similar device. Using feed forward control and steam injection, the apparatus of this invention virtually instantaneously heats water when signaled to do so. Such heating is accomplished substantially regardless of flow rate. It is therefore an object of the instant invention to provide extremely rapid heating of water. It is further an object of this invention to heat water at substantially any flow rate within the maximum capacity rating of the specific apparatus. Yet another object of this invention is to provide heated water by steam injection. Still another object of this invention is to maximize the safety and minimize noise and vibration of the apparatus of this invention by reducing agitation caused by the intermixing of steam and water.

SUMMARY OF THE INVENTION

An apparatus for controlling the temperature of a supply of water by selective injection of steam is disclosed. The apparatus comprises a water supply conduit which includes a water inlet end and a water outlet end. Steam is supplied to the apparatus by a steam supply conduit which supplies steam to the water supply conduit at a predetermined location between the water inlet end and the water outlet end of the water supply conduit. The steam entering the water supply conduit is controlled by a steam supply control valve located on the steam supply conduit. A pressure differential sensing means senses the difference in pressure along the water supply conduit between a first point in said water supply conduit upstream of said predetermined location and a second point in the water supply conduit downstream of the predetermined location. A means for controlling the control valve means in response to this sensed pressure differential is also required.

The water and steam may be directly mixed in a mixing means at the predetermined location in the water supply conduit. This mixing means comprises a longitudinally extending body having mounted concentrically within the body an inner sleeve which directs water through the body. An annular space between the body and inner sleeve is thus created. Steam entering the mixing means through a steam inlet means accumulates in this annular space. It is currently preferred that the steam inlet means be perpendicularly disposed to the longitudinally extending body with respect to the inner sleeve. Steam in the annular space passes through the inner sleeve through aperture means and thereafter the steam can directly contact the water flowing through the inner sleeve causing the water to be heated. In a currently preferred embodiment, the aperture means comprises a plurality of slots extending through the inner sleeve.

The steam supply control valve contained in this apparatus includes a valve seat within the steam supply conduit. A valve control plug conduit is movably mounted with respect to the valve seat. The control plug controls the flow of steam through the steam supply conduit via the movement of the valve plug relative to the valve seat. The contour plug is shaped to provide the required steam flow to heat the water to the desired temperature over a full range of water flow rates. The steam supply control valve may additionally include diaphragm means comprising first and second faces. A connecting rod means is included in the supply control valve means and directly connects the diaphragm means to the valve plug. A biasing means for biasing the rod means so as to sit properly in the valve seat when closed can be included. The diaphragm means operatively connects the valve control plug for movement relative to the valve seat in response to movement of the diaphragm means.

The pressure differential sensing means comprises a first pressure communicating line for communicating pressure. This pressure is communicated from the aforesaid first point in the water supply conduit to the first face of the diaphragm membrane. A second pressure communicating line is also included in the pressure differential sensing means. This second line communicates pressure sensed at the second point in the water supply conduit to the second face of the membrane.

The apparatus may also include a recirculating means for recirculating water within the apparatus. The recirculating means comprises a recirculation conduit means for providing fluid communication between a third point in the water supply conduit downstream of the aforementioned predetermined location and a fourth point in the water supply conduit means upstream of the predetermined location. The recirculation means preferably includes a recirculation pump to facilitate fluid movement. Check valve means may also be included to prevent reverse flow in the recirculation means from the fourth point to the third point.

A process is also disclosed by this invention by which the temperature of water may be controlled using steam injection. This method comprises conducting water from a water inlet to a water outlet. Steam required for this process is supplied to the water at a predetermined location intermediate of the water inlet and water outlet. The differential pressure in the water between a first point downstream of the predetermined location and a second point upstream of the predetermined location is sensed. The supply of steam to the water in response to the sensed differential pressure is controlled. The method may include directly mixing the steam and the water at a predetermined location. At least a portion of the water supplied may be recirculated from a third point downstream of the predetermined location to a fourth point upstream of the predetermined location. The control of the steam supply in this method can include provisions for a movable valve within a valve seat wherein the movable valve may move in response to a sensed differential pressure.

BRIEF DESCRIPTION OF THE FIGURES

The above description as well as further objects, features, and advantages of the present invention will be more fully understood by reference to the following detailed description of a presently preferred, but nonetheless illustrative water heating apparatus in accordance with the present invention when taken in conjunction with the accompanying drawings wherein.

DETAILED DESCRIPTION

Figure 1:
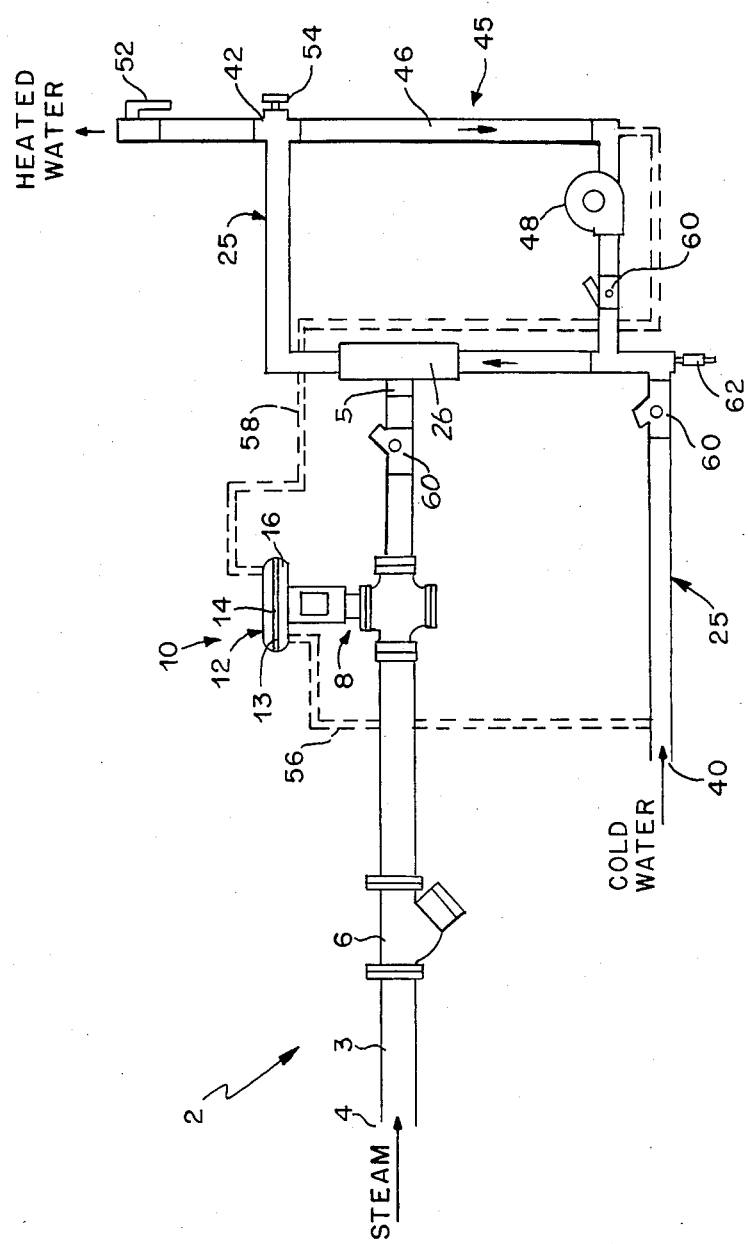
FIG. 1 is a side view of a schematic representation of the steam injection, feed forward water heating apparatus.

An apparatus and method for rapidly heating water by steam injection is disclosed. The apparatus, generally depicted by reference numeral 2, comprises a steam supply conduit 3. The steam supply conduit 3 is an aqueduct or pipe for carrying steam from a inlet end 4 of the conduit to a outlet end 5 of the conduit. A strainer 6 may be attached to the steam supply conduit 3, preferably located at the upstream or inlet end 4 of the steam supply conduit.

Figure 2:
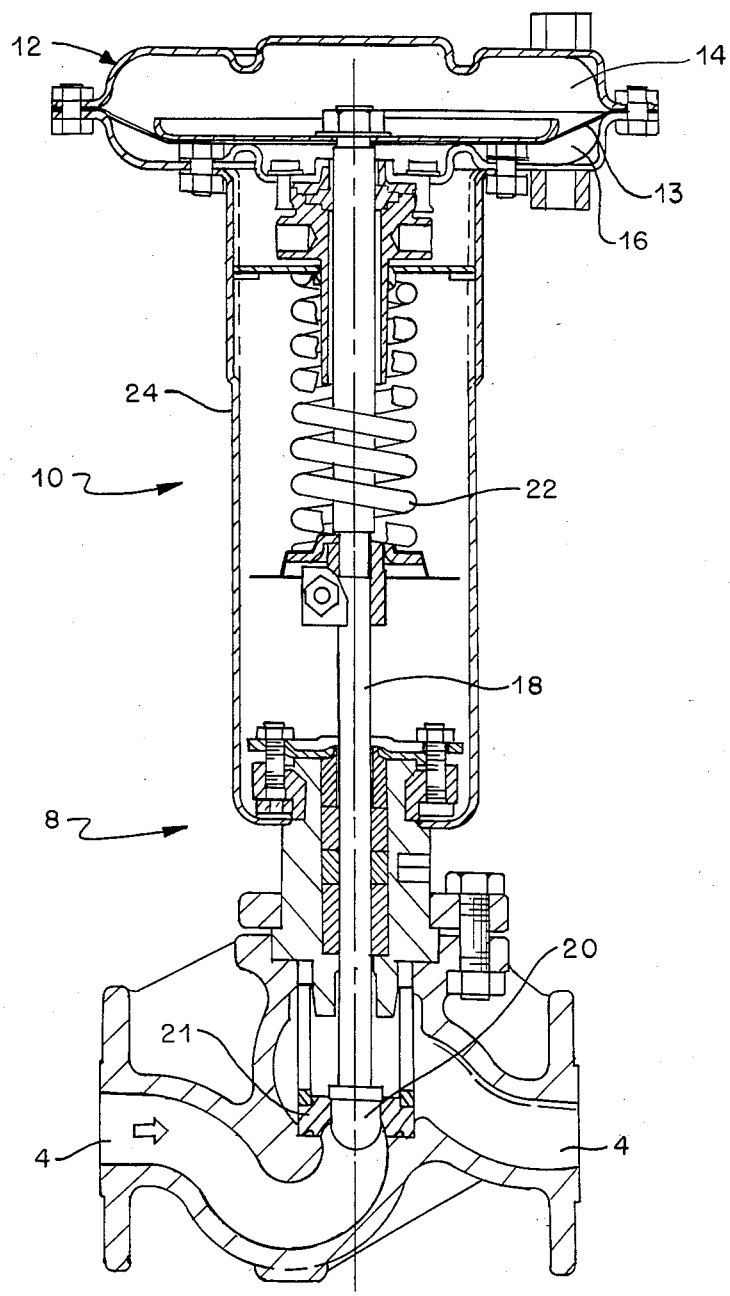
FIG. 2 is a schematic cross-sectional view of the steam injection control valve.

The steam supply conduit 3 extends through a steam supply control valve 8, which is most clearly shown in FIG. 2. The control valve 8 is operated by a pressure differential sensor 10 as embodied by a diaphragm actuator 12. Bisecting the diaphragm actuator 12 is a membrane 13 defining a first face 14 and a second face 16. Responsively attached to the membrane 13 of the diaphragm actuator 12 is a stem 18. A valve control plug 20 of predetermined contour is located on the distal end of the connecting stem 18 so that it may rest in a valve seat 21. The initial position of the stem 18 may be accomplished by a biasing means, such as spring 22.

Figure 3:
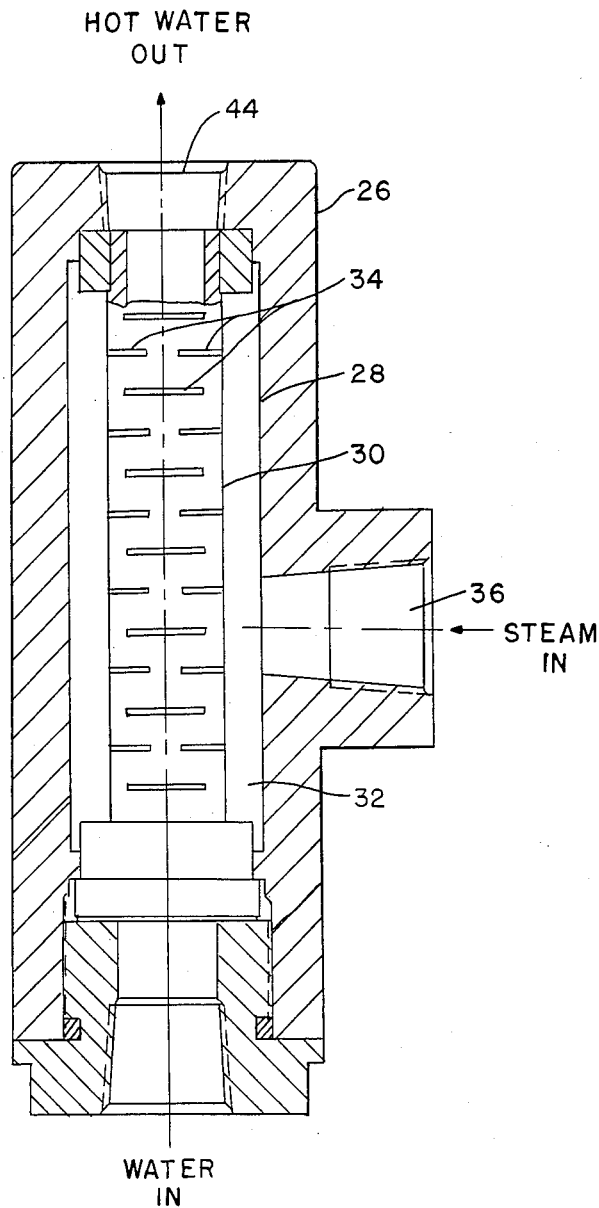
FIG. 3 is a schematic cross-sectional representation of the steam injector.

The steam supply conduit 3 connects to a water supply conduit 25 at a mixing means or steam injector 26 as seen most clearly in FIG. 3. The steam injector 26 has a longitudinally extending body 28, and includes an inner sleeve 30 for directing water through the body, the inner sleeve 30 being mounted concentrically within the longitudinally extending body 28. Between the extending body 28, and the inner sleeve 30, is an annular space 32. The inner sleeve 30 contains apertures 34, which are preferedly a plurality of slots, through which steam can directly contact the water within the inner sleeve from the annular space 32. Steam enters the annular space 32 through a steam inlet 36 coupled to the longitudinally extending body 28 so that the steam inlet 36 is perpendicularly disposed with respect to the inner sleeve 30. The inner sleeve 30 directs water through the mixing means 26. Referring again to FIG. 1, water is provided from a inlet end 40 of the water supply conduit 25 which terminates at a outlet end 42. The water supply conduit 25 may be a pipe, aqueduct, or similar structure capable of supplying water to the apparatus 2. The steam injector 26 has an outlet port 44 for the egress of heated water. It is currently preferred that the outlet port 44 be in line with the flow of water through the inner sleeve 30 so that water flow proceeds in a substantially straight course. Further, in the currently preferred embodiment, as shown in FIG. 3, the steam inlet 36 is disposed perpendicularly to the direction of water flow through the inner sleeve 30.

The apparatus may include a recirculation loop 45 including a recirculating conduit 46 to recirculate water from the outlet end 42 of the water supply conduit 25 to another location on the water supply conduit 25 upstream of the mixing means 26. The recirculating conduit 46 is most preferably of a predetermined diameter to correspond with and not obstruct the flow of water through the inner sleeve 30 of the mixing means 26. In the presence of the recirculating conduit 46 there is preferably, integrated with it, a recirculation pump 48. The size of the recirculation pump 48 may vary.

Heated water is released from the outlet end 42 of the water supply conduit 25 under control of a water release control valve 52. The water release control valve 52 may be any commonly used type of valve, such as a ball valve. It is desirable for a temperature sensor 54 to be mounted near the outlet end 42 to facilitate temperature detection of the heated water therein. The temperature sensor 54 should preferably be proximate to the water release control means 52 so that the actual temperature of the heated water at egress from the apparatus 2 may be ascertained.

Pressure differential measurement is provided through first and second pressure communication lines 56 and 58 respectively, for communicating pressure from different locations in the apparatus 2 to the diaphragm actuator 12. The first pressure communication line 56 communicates pressure from a first point upstream of the location at which steam and water are mixed to the second face 16 of the membrane 13 in the diaphragm actuator 12. The second pressure communication line 58 communicates pressure from a second point downstream of the location at which steam and water are mixed to a first face 14 of the membrane 13 in the diaphragm actuator 12.

It would be understood by one skilled in the art that certain other additions to the apparatus 2 may be made. For instance, throughout the apparatus 2 various check valve means 60 may be placed to prevent backflow of water or steam in the apparatus. Also, a drain 62 may be placed in the apparatus 2 to drain water or steam from the apparatus.

The apparatus 2 operates to rapidly heat water by mixing steam with water. This is accomplished very rapidly by the sensing of pressure differences between entering cold water and water which has been heated.

The mechanism by which this is accomplished is a feed forward control system which can rapidly respond to water flow variations so that the temperature of the heated water exiting the apparatus 2 is within a range of 4° Fahrenheit from a desired, predetermined temperature. The predetermined temperature is adjusted by controlling the presence of steam entering the steam supply conduit 3. This can be accomplished by known regulating devices ideally located near the inlet end 4 of the steam supply conduit 3 which provide the proper steam pressure supplied to the apparatus 2 to yield the desired water temperature.

Steam enters the apparatus 2 through the steam supply conduit 3. The steam supply conduit 3 extends from the source of steam through the steam supply control valve 8 and connects with the mixing means 26 by a steam inlet means 36. Upstream of the point at which the steam supply conduit 3 enters the control valve 8 is an optional strainer 6 for straining impurities from the entering steam. Steam flow through the control valve 8 is regulated by a contoured control valve plug 20. The contoured control plug 20 responds to the pressure differential sensed by the pressure differential sensing means 10. In the embodiment shown in FIG. 1, the pressure differential is communicated to the diaphragm actuator 12. The differences in pressure between the first face 14 and the second face 16 of the diaphragm actuator 12 are detected by the membrane 13 and communicated by a connecting stem means 18 to the valve control plug 20. If the pressure differential between the water entering the apparatus 2 and the heated water in the apparatus is such that injection of additional steam is required, the connecting stem 18 will cause the valve control plug 20 to be lifted from the valve seat 21 thereby providing passage of steam through the valve 8. If, on the other hand, the pressure differential is such that no additional heating of water is necessary, the valve control plug 20 remains in the valve seat 21 thereby blocking passage of steam through the control valve 8.

Pressure differential in the apparatus 2 is communicated to the pressure differential sensor 10, exemplified in this embodiment by the diaphragm actuator 12, by the first and second pressure communication lines 56 and 58, respectively. The first pressure communication line 56 communicates the pressure of the unheated water in the water supply conduit 25 to the second face 16 of the membrane 13. The pressure of heated water is communicated by the second pressure communication line 58 to the first face 14 of the membrane 13. Preferably, the second pressure communication line 58 should be located between the mixing means 26 and the water release control means 52. If the recirculating conduit 46 is present on apparatus 2 the second pressure communication line 58 may be located thereon. As noted, most preferably the recirculating conduit 46 has integrated therewith a recirculating pump 48. Under circumstances in which there will always be an elevated water flow rate through the water supply conduit 25 the recirculating loop 45 may be omitted. It is currently envisioned that such will be the case when the minimum demand on the apparatus 2 is approximately 25% of design capacity.

The precise amount of steam necessary to obtain the desired water temperature results from a precise contouring of the valve control plug 20. The shape of the plug 20 is calculated according to a mathematical formula corresponding to pressure differential so that the proper flow area through the valve seat is created. The valve control plug 20 is generally designed by running flow tests to establish the relationship between water flow and the position of the plug. Calculations are made using standard industry formulas. For instance, calculations to determine required steam flow rates are as follows:

$$Ws = \frac{Ww \times (T2 - T1) \times Sh}{(h_g1 - h_f2)}$$

In the above formula, Ws is required steam flow rate in pounds per hour; Ww is water flow rate in pounds per hour; T2 is water outlet temperature in degrees Fahrenheit; T1 is water inlet temperature in degrees Fahrenheit; $h_g1$ is the enthalpy of supply steam in BTU per pound; $h_f2$ is the enthalpy of steam condensate; and Sh is specific heat of water in BTU per pound per degree Fahrenheit. Once the required steam flow rate is known, the required plug flow area can be calculated using industry standard valve sizing equations. The valve control plug 20 thus supplies a proportional amount of steam at all water flow rates.

When there is no water flow, it is necessary to close the steam valve completely. In such an instance, it is necessary to pre-load the control valve 8 so that the valve control plug 20 rests in the valve seat 21 despite the steam pressure force tending to open it. This can be facilitated through the use of a spring 22. It would be similarly understood that any movement of either of the pressure communication lines 56 and 58 to different locations within the apparatus 2 would result in different pressure dynamics which may necessitate a new pre-loading of the control valve 8 and a recalibration of the pressure necessary to generate a desired temperature.

After steam passes through the steam supply control valve 8, steam continues flowing in the steam supply conduit 3 to the steam inlet means 36 attached to the longitudinally extending body 28 of the mixing means 26. Water to be mixed with the steam enters the mixing means 26 from the water supply conduit 25. Water flows through the steam injector 26 in an inner sleeve 30 concentrically surrounded by the longitudinally extending body 28. The outlet port 44 of the mixing means 26 is preferably located so that the entering water flows in a substantially straight course through the mixing means.

Steam enters the mixing means 26 from the steam supply conduit 3 through the junction created by the steam inlet means 36. The steam inlet means 36 is coupled to the longitudinally extending body 28 in such a manner as to allow steam to enter an annular space 32 defined by the extending body and by the inner sleeve 30. The inner sleeve 30 contains aperture means 34 through which the steam passes from the annular space 32 to the water flowing within the inner sleeve. The aperture means 34 preferably includes a plurality of slots shaped and disposed parallel to the flow of steam entering through steam inlet means 36. By this configuration, only small jets of steam will come into contact with the water. It is currently preferred that the aperture means 34 be arranged in a designated pattern as depicted in FIG. 3. This preferably sizing and shaping of the aperture means 34 contributes to the elimination of undue agitation of water when it intermixes with steam.

Heated water flows out of the mixing means 26 through the outlet port 44. The heated water travels through the water supply conduit 25 to supply end 42 and exits the apparatus 2 selectively upon triggering of the water release control means 52.

If the apparatus 2 includes a recirculation means 45, the water supply conduit 25 should connect with the recirculating conduit 46 immediately downstream of the water release point. The recirculating conduit 46 connects, at its other end, with a second point of the water supply conduit 25 upstream of the point at which steam and water mix. Recirculation is insured in the presence of recirculating conduit 46 through the preferred use of recirculating pump 48. Incorporation of a recirculating system increases the velocity of water through the mixing means 26 at low flow rates for more effective mixing of steam and water. Under circumstances and applications of continous high flow rates the recirculating pump 48 and the recirculating line 46 may be omitted.

Persons skilled in the art will recognize that check valve means 60 may be located throughout the apparatus 2 at any location in which backflow is to be prevented. As currently envisioned, at least one check valve should be located in the recirculation conduit 46. Water may be sampled or drained at any point in the apparatus 2 by a draining means 62.

It will be understood that the embodiments described herein are exemplary and that a person skilled in the art may make many variations and modifications without departing from the spirit and scope of the invention. All such modifications and variations are intended to be included from the scope of the invention as defined in the appended claims.

What is claimed is:

1. Apparatus for controlling the temperature of a supply of water comprising a water supply conduit including a water inlet end and a water outlet end, a steam supply conduit for supplying steam to said water supply conduit at a predetermined location between said water inlet end and said water outlet end, steam supply control valve means for controlling the supply of said steam to said water supply conduit at said predetermined location thereon, pressure differential sensing means for sensing the differential pressure in said water supply conduit between a first point in said water supply conduit upstream of said predetermined location and a second point in said water supply conduit downstream of said predetermined location, and valve control means for controlling said steam supply control valve means in response to said sensed differential pressure.

2. The apparatus of claim 1 including mixing means for directly mixing said stream and said water at said predetermined location in said water supply conduit.

3. The apparatus of claim 2 wherein said mixing means comprises a longitudinally extending body, an inner sleeve mounted concentrically within said body for directing said water through said body, thereby defining an annular space between said body and said inner sleeve, said inner sleeve including aperture means extending therethrough, and steam inlet means for supplying said steam to said annular space, whereby said steam can directly contact said water flowing within said inner sleeve through said aperture means so as to heat said water therein.

4. The apparatus of claim 3 wherein said aperture means comprises a plurality of slots extending through said inner sleeve.

5. The apparatus of claim 3 wherein said steam inlet means is perpendicularly disposed in said body with respect to said inner sleeve.

6. The apparatus of claim 1 wherein said steam supply control valve means includes a valve seat within said steam supply conduit and a valve control plug movably mounted with respect to said valve seat for controlling the flow of said steam through said valve seat upon movement of said valve plug therein.

7. The apparatus of claim 6 wherein said steam supply control valve means includes diaphragm means operatively connected to said valve control plug for moving said valve control plug in response to movement of said diaphragm means.

8. The apparatus of claim 7 wherein said diaphragm means comprises first and second faces, and wherein said pressure differential sensing means comprises a first pressure communicating line for communicating said pressure sensed at said first point in said water supply conduit to said first face of said diaphragm means, and a second pressure communicating line for communicating said pressure sensed at said second point in said water supply conduit to said second face of said diaphragm means.

9. The apparatus of claim 8 wherein said steam supply control valve means includes connecting stem means for directly connecting said diaphragm means to said valve plug, and further including biasing means for biasing said connecting stem means so as to seat said valve plug in said valve seat.

10. The apparatus of claim 1 including recirculating means comprising recirculation conduit means for providing fluid communication between a third point in said water supply conduit downstream of said predetermined location and a fourth point in said water supply conduit upstream of said predetermined location.

11. The apparatus of claim 10 wherein said recirculation means includes a recirculation pump.

12. The apparatus of claim 11 wherein said recirculation means includes check valve means for preventing reverse flow in said recirculation means from said fourth point to said third point.

13. A method for controlling the temperature of a supply of water comprising conducting a supply of water in a conduit from a water inlet to a water outlet, supplying steam to said supply of water at a predetermined location intermediate of said water inlet and said water outlet, sensing the differential pressure in said conduit between a first point downstream of said predetermined location and a second point upstream of said predetermined location, and controlling supply of said steam to said supply of water in response to said sensed differential pressure.

14. The method of claim 13 including directly mixing said steam and said water at said predetermined location.

15. The method of claim 13 including recirculating at least a portion of said supply of water from a third point downstream of said predetermined location to a fourth point upstream of said predetermined location.

16. The method of claim 13 wherein said controlling of said supply of steam includes providing a movable valve within a valve seat, and including moving said movable valve in response to said sensed differential pressure.

* * * * *